United States Patent [19]
Charpentier

[11] 3,875,998
[45] Apr. 8, 1975

[54] INSTALLATION FOR SEPARATION ON THE SEABED OF THE EFFLUENTS FROM UNDERWATER OIL WELLS

[75] Inventor: Pierre Charpentier, Louveciennes, France

[73] Assignee: Entreprise de Recherches et D'Activities Petrolieres (Elf), Paris, France

[22] Filed: Oct. 27, 1972

[21] Appl. No.: 301,279

[52] U.S. Cl.................................. 166/.5; 175/8
[51] Int. Cl............................................. E21b 7/12
[58] Field of Search............................. 166/.5, .6; 175/7–9

[56] References Cited
UNITED STATES PATENTS

| | | | |
|---|---|---|---|
| 2,988,144 | 6/1961 | Conrad | 166/.5 |
| 3,366,173 | 1/1968 | McIntosh | 166/.5 |
| 3,503,443 | 3/1970 | Blanding et al. | 166/.6 |
| 3,517,735 | 6/1970 | Fairbanks et al. | 166/.5 |
| 3,525,388 | 8/1970 | McClintock | 166/.5 |
| 3,536,135 | 10/1970 | Dozier | 166/.5 |
| 3,543,846 | 12/1970 | Smith et al. | 166/.5 |
| 3,782,458 | 1/1974 | Slack | 166/.5 |

*Primary Examiner*—Frank L. Abbott
*Assistant Examiner*—Richard E. Favreau
*Attorney, Agent, or Firm*—Brisebois & Kruger

[57] ABSTRACT

An installation for separation on the seabed of the effluents from underwater oil wells, consisting of a base with negative buoyancy anchored on the seabed, a hermetic caisson attached to this base and preferably articulated on it, equipped with at least one gas/liquid separator, which is connected by pipes to each underwater well and from which one pipe leads to a burner, with another pipe to draw off the liquid phase, a buoyant tubular column surmounting the caisson and communicating with it, the upper end of this column, which is above water, supporting a platform, and means inside the caisson of controlling the operation of the separator.

7 Claims, 7 Drawing Figures

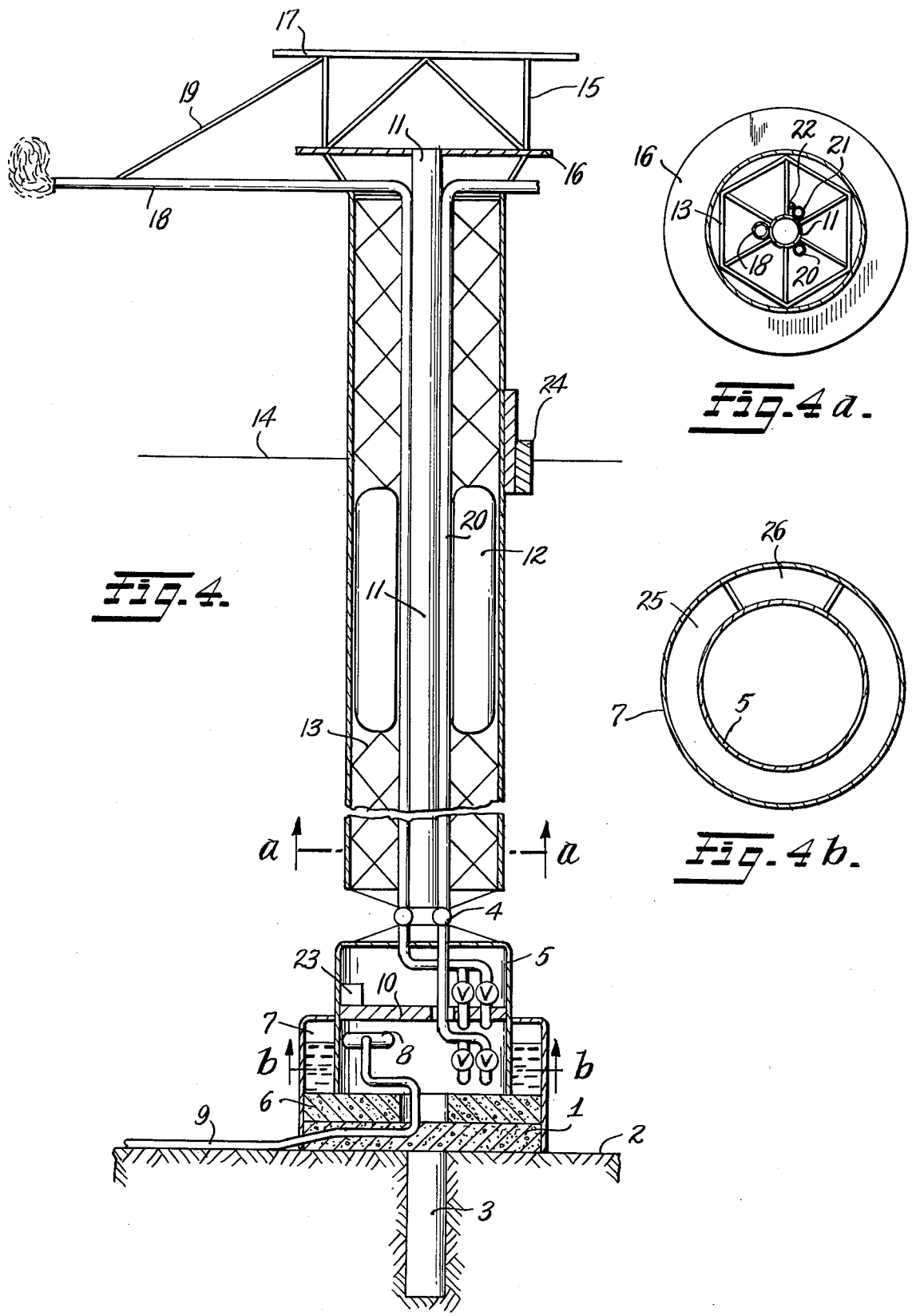

INSTALLATION FOR SEPARATION ON THE SEABED OF THE EFFLUENTS FROM UNDERWATER OIL WELLS

This invention concerns an installation for separation on the seabed of the effluents from underwater oil wells.

The effluents from oil wells are two- or three-phase mixtures of gas, liquid hydrocarbons and water. Before removal for refining and consumption, they have to be degassed, and the moisture content reduced as far as possible, to obtain a liquid hydrocarbon phase, the steam pressure of which is compatible with conveyance by pipe line or tanker, with moisture and gas contents meeting certain standards laid down by users, particularly refineries.

This separation of the gas and water content of effluents is usually done in separators, tanks operating at uniform pressure, by means of a system of adjustable valves on the liquid hydrocarbon, gas and possibly water outlets. A series of deflectors suitably positioned inside the separator slows down the flow of the polyphase mixture, preventing liquid droplets from being drawn into the gas, and gas bubbles from entering the liquid phase. One separator can be used, or batteries of separators assembled in series and each set at a given pressure, which may or may not be equal to atmospheric pressure.

When oil is being produced from an underwater well, separation operations sometimes have to be done at sea, particularly when the oil field is far away from the coast.

One method of doing this is to instal separators on a fixed above-water platform anchored near the oil wells, and connected with the various wellheads on the seabed by a series of supply pipes. The drawback to this solution, however, is the scale of the structures involved in a floating collection point of this kind, in view of the resistance set up to the swell by the collecting pipes reaching the platform.

Another method is to carry out separation on the seabed, using submerged equipment without a surface installation, resting on the seabed near the oil wells. Access to such equipment is difficult, however, when intervention is required, and it is unreliable.

The present invention offers a way of overcoming the disadvantages of these other methods.

The installation described in this invention for separation on the seabed of the effluents from underwater oil wells consists of a negatively-buoyant base anchored on the seabed near the underwater oil wells, a hermetic caisson attached to this base, and containing at least one gas/liquid separator, which is connected by pipes to each of the underwater wells, with one outlet pipe leading to a burner, for gas released into the atmosphere, and another outlet pipe to draw off the gas-free liquid phase, the connecting points between these pipes and the separator being situated inside the caisson, a buoyant tubular column surmounting the caisson, the upper end of which is above water and carries a platform, and the inside of which communicates through an airtight coupling with the inside of the caisson, so that platform and caisson are in communication, and valves fitted to the parts of the gas- and liquid-phase-outlet pipes inside the caisson, to regulate the flow of fluid in each of the pipes, and thus control operation of the separator.

In one embodiment of the installation, the caisson is fixed directly to the base, and the tubular column is connected to the caisson by means of an articulated joint allowing movement in two directions.

In another embodiment of the installation, the caisson is connected to the base by an articulated joint allowing movement in two directions, and the tubular column is fixed rigidly to the caisson.

In one recommended embodiment of the installation, the separator is divided into two compartments, communicating at the bottom, one small compartment used for monitoring and the other for actual separation, both compartments being fed simultaneously, and each equipped with a gas-discharge pipe connected to the burner, with the gas-free liquid phase being drawn off through a pipe at the bottom of the larger compartment.

In another recommended embodiment, the separators operate at approximately atmospheric pressure.

The caisson must be large enough in volume to hold the oil-production installations, and equipment for the control and monitoring of the separator or separators and removal of the gas-free liquid hydrocarbons towards the storage point. A cylindrical caisson with an annular separator can be used. In this case, the pipes conveying the oil from the well to the separator have to pass through the separator or the base of the caisson. Alternatively, a parallelepiped-shaped caisson can be used, with two cylindrical separators, one on each of two parallel side walls of the caisson. The pipes bringing the oil from the wells to the separators can then pass through the two side walls of the caisson without separators.

The caisson can be pressurized or remain at atmospheric pressure.

Electricity is fed to the caisson by cables descending from the platform, or reaching the seabed from a distribution centre. The caisson also contains a ventilation system, consisting for instance of two shafts descending from the platform along the tubular column, one supplying the caisson with fresh air and the other removing the stale air.

It will be easier to understand the invention from the following description of one of its embodiments, with reference to the accompanying FIGS. The invention is naturally in no way confined to this single embodiment.

FIG. 1 shows, in diagrammatical form, a seabed separation installation as described in the invention, while FIGS. 1a and 1b are cross-sectional views of FIG. 1, along lines a—a and b—b respectively.

FIG. 4 shows an installation according to the invention in which the caisson is fixed directly to the base.

FIG. 4a is a sectional view taken along the line a—a of FIG. 4.

FIG. 4b is a sectional view taken along the line b—b of FIG. 4.

Figure 1:
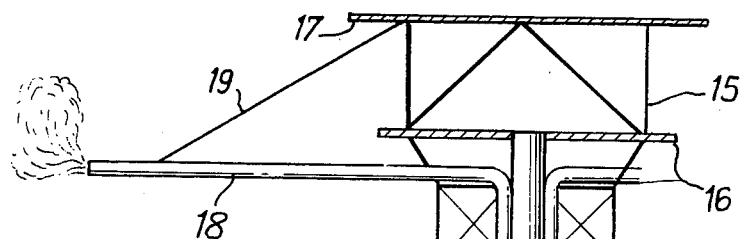

FIGS. 1, 1a and 1b show a base 1 with strongly negative buoyancy, preferably a concrete slab, resting on the seabed 2 and anchored to it by being attached to a drilled pile 3. Naturally, any other method of anchoring the base to the seabed can be used. An articulated joint 4, allowing movement in two directions, attaches the base to a caisson 5, at the bottom of which is a cement slab 6, providing ballast for the caisson and reducing the strain on the articulated joint. The caisson is surrounded by an annular atmospheric separator 7 divided into a large separation compartment 25 and a small monitoring compartment 26, and fed by a manifold 8 inside the caisson, linked by pipes 9 to the different oil wells (not shown here). These pipes rest on the base 1 and enter the caisson through a central passage in the articulated joint and the base of the caisson. The caisson is divided into two levels by a floor 10, containing a central passage. A tubular column 11, the upper end of which is above water, is fixed rigidly and hermetically to the caisson. It is equipped with floats 12, held in a steel trellis 13 which surrounds the column. The part of the column above the surface of the sea 14 is surmounted by a platform 15, containing a handling deck 16 and a helicopter pad 17. The inside of the column 11 communicates with the inside of the caisson, allowing access to caisson from platform, or to platform from caisson. A burner 18, connected with each of the separator compartments 25 and 26, places these compartments in communication with the atmosphere, to remove gas released during separation. The burner pipe ascends along the column and is fixed to the platform 15 by a rigid steel unit 19. Two ventilation shafts 20 and 21 descend from the platform to the caisson, supplying fresh air to the caisson and removing the stale air. Electricity is brought from the platform to a transformer 23 inside the caisson, along an electric cable 22 which also descends along the column. This column may be fitted with mooring equipment for a boat 24.

Figure 2:
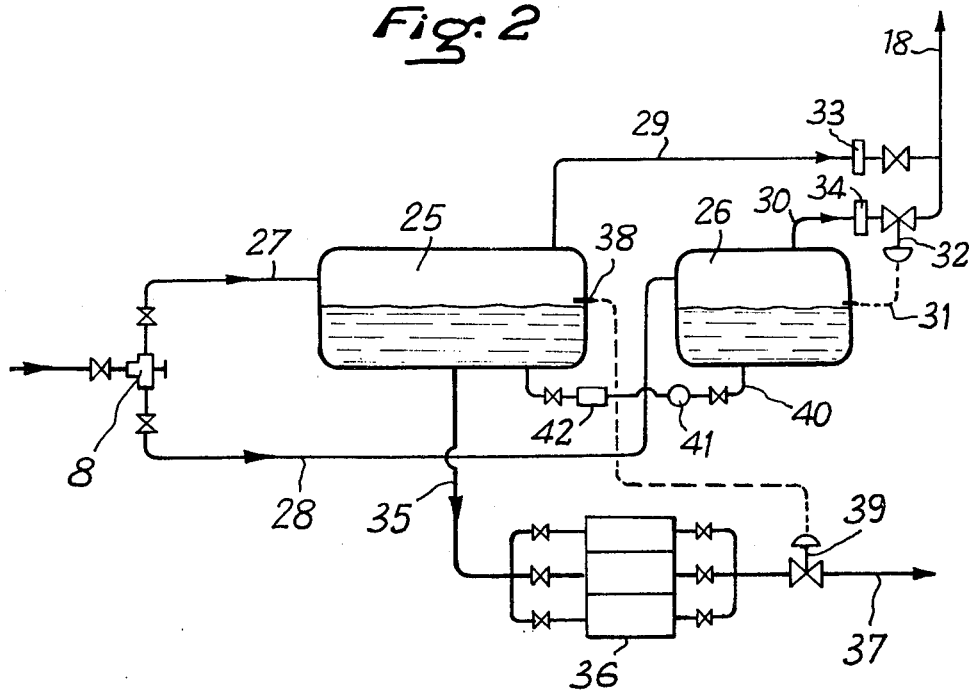
FIG. 2 shows, in diagrammatical form, the installations inside the caisson and the separator.

In FIG. 2, the oil from the wells reaches the manifold 8 along the pipes 9, and penetrates through a pipe 27 into the main compartment 25 of the separator 7, and through another pipe 28 into the monitoring compartment 26. The burner 18 is connected by a pipe 29 to the top of the main compartment 25 and by another pipe 30 to the top of the smaller compartment 26. A regulator 31, acting on a valve 32 on the pipe 30 allows the pressure in the two compartments of the separator to be controlled. Meters 33 and 34 on the gas pipes 29 and 30 allow the volume of gas eliminated by the burner 18 to be measured. The gas-free liquid hydrocarbons are drawn off from the main compartment 25 by a pipe 35 connected to a set of pumps 36, which discharge the liquid hydrocarbons along another pipe 37 to a floating storage centre (not shown here). A level gauge 38, acting on a valve 39 on the pipe 37 allows the level of the liquid in the main compartment 25 of the separator 7 to be kept steady. A pipe 40, carrying a meter 41 and a moisture-content gauge 42, connects the lower part of one compartment 26 with the lower part of the other 25, allowing liquid hydrocarbons degassed in the smaller compartment 26 to be drawn off (by the pipe 35).

Other installations, not shown here, can also be placed in the caisson. For instance, when underwater wells have to be equipped with seabed pumps, the energy required, whether electrical (for electro-pumps) or hydraulic (for hydro-ejectors) can be supplied from the caisson.

A seawater filtration plant can also be installed in the caisson, and filtered water injected into the injector wells.

Figure 3:
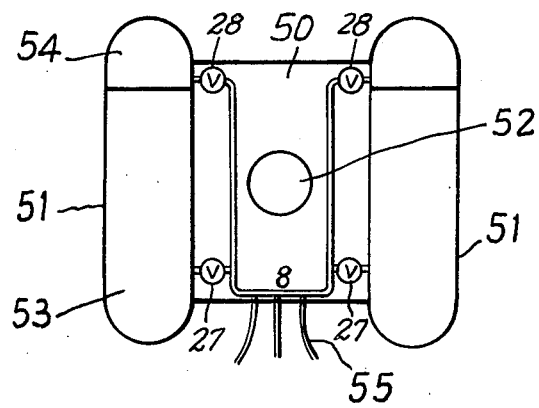
FIG. 3 is a cross-sectional view of another embodiment of the caisson and separators.

FIG. 3 shows, in diagrammatical form, a cross-sectional view from underneath of a parallelepiped-shaped caisson 50 connected to two cylindrical separators 51 and a tubular column 52. The cylindrical separators are fixed to two parallel side walls of the caisson, and each separator is divided into a main separation compartment 53 and a smaller monitoring compartment 54. Each separator is fed by a manifold (not shown here) inside the caisson, receiving the oil from the wells along pipes 55 passing through one of the side walls of the caisson not fitted with a separator. The installations in the caisson accompanying each of the cylindrical separators, to feed the main compartment 53 and monitoring compartment 54 of the separator, remove the gas and draw off the gas-free liquid hydrocarbons, are similar to those for the annular separator described in connection with FIG. 2.

This seabed separation installation can be installed using a similar technique to that employed for the placing of articulated structures for underwater drilling.

To begin with the base, prepared on land and incorporating a system for connection to the articulated joint, is conveyed to a position directly above the spot selected for anchorage, by a suitable system of floats. It is then submerged and anchored to the seabed, using the drilled pile method, or any other suitable method known in the previous art.

Next, the structure consisting of the caisson-separator unit, with the articulated joint and surmounted by the tubular column, is floated horizontally to the site, possibly using the floats on the column, with auxiliary floats if necessary. When it is on the site, it is tipped over by ballasting the floats on the column. The structure is then centred over the base, and its buoyancy is reduced, so that it sinks.

On completion of submersion, the articulated joint fits into the connector system on the base, and is locked to it.

What is claimed is:

1. An installation for the separation of the effluents from underwater oil wells, consisting of a negatively buoyant base member adapted to be anchored on the seabed near the underwater oil wells, a water-tight caisson attached to said base member, and provided with at least one gas/liquid separator, said separator being connected by inlet pipes to each of the under-water wells, and equipped with one outlet pipe leading to a burner for gas released into the atmosphere, and another outlet pipe to draw off the gas-free liquid phase, said pipes being connected to said separator through points situated inside the caisson, a buoyant tubular column member surmounting the caisson, the upper end of which is above water and carries a platform, and the inside of which provides access to the inside of the caisson, so that the platform and caisson are in communication, valves mounted in the parts of the gas-and liquid-phase-outlet pipes inside the caisson, to regulate the flow of fluid in each of the pipes, and thus control operation of the separator, and an articulated joint connecting said caisson to the base member, the tubular column member being fixed rigidly to the caisson.

2. An installation as defined in claim 1, in which the caisson is fixed directly to the base member, and the tubular column member is connected to the caisson by means of said articulated joint.

3. An installation as defined in claim 1, in which the caisson is cylindrical, with an annular separator surrounding it.

4. An installation as defined in claim 1, in which the caisson is parallelepiped-shaped, with two cylindrical separators, one on each of two parallel side walls of the caisson.

5. An installation as defined in claim 4, in which the pipes conveying the oil from the wells to the separators passes through one of the side walls of the caisson without separator.

6. An installation as defined in claim 1, in which each separator is divided into two compartments of unequal size, communicating at the bottom, the smaller of said compartments being used for monitoring and the other for actual separation, both compartments being fed simultaneously, and each being equipped with a gas-discharge pipe connected to the burner, with the gas-free liquid phase being drawn off through a pipe at the bottom of the larger compartment.

7. An installation as claimed in claim 1 in which the tubular column has two open ends and thereby maintains the caisson in communication with the open air.

* * * * *

UNITED STATES PATENT AND TRADEMARK OFFICE
CERTIFICATE OF CORRECTION

PATENT NO. : 3,875,998
DATED : April 8, 1975
INVENTOR(S) : PIERRE CHARPENTIER

It is certified that error appears in the above-identified patent and that said Letters Patent are hereby corrected as shown below:

[30] Foreign Application Priority Data

October 29, 1971       France.........71 39006

Signed and Sealed this thirtieth Day of March 1976

[SEAL]

*Attest:*

RUTH C. MASON
*Attesting Officer*

C. MARSHALL DANN
*Commissioner of Patents and Trademarks*